(12) United States Patent
Arich et al.

(10) Patent No.: US 7,017,680 B2
(45) Date of Patent: Mar. 28, 2006

(54) HAND HELD DRILLING AND/OR HAMMERING TOOL WITH DUST COLLECTION UNIT

(75) Inventors: Klaus-Dieter Arich, Huenstetten-Beuerbach (DE); Thomas Stanke, Idstein (DE); Ernst Staas, Limburg (DE); Ralf Bernhart, Idstein (DE); Robert Wache, deceased, late of Weisbaden (DE); by Rosi Wache, legal representative, Weisbaden (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/804,416

(22) Filed: Mar. 19, 2004

(65) Prior Publication Data

US 2004/0231871 A1    Nov. 25, 2004

(30) Foreign Application Priority Data

Mar. 21, 2003 (GB) ..................... 0306487

(51) Int. Cl.
*B25D 17/14* (2006.01)

(52) U.S. Cl. ............. 173/198; 173/217; 173/171; 173/75; 408/58; 408/67; 175/209

(58) Field of Classification Search ............ 173/29, 173/198, 217, 171, 197, 213, 75, 97; 175/209, 175/211; 408/58, 67
See application file for complete search history.

(56) References Cited

U.S. PATENT DOCUMENTS

| | | | |
|---|---|---|---|
| 2,041,689 A | | 5/1936 | Baumeister, et al. |
| 3,511,322 A | * | 5/1970 | Holman et al. ............... 173/75 |
| 3,850,254 A | * | 11/1974 | Hirdes ......................... 173/75 |
| 3,900,787 A | | 8/1975 | Koster |
| 4,051,547 A | | 9/1977 | Wood |
| 4,064,952 A | * | 12/1977 | Lechner ...................... 175/209 |
| 4,097,176 A | | 6/1978 | Wanner et al. |
| 4,207,953 A | * | 6/1980 | Reibetanz et al. ......... 175/209 |
| 4,209,069 A | * | 6/1980 | Smith ......................... 173/75 |
| 4,780,805 A | | 10/1988 | Chewuk |
| 4,783,729 A | | 11/1988 | Konopka |
| 4,825,140 A | | 4/1989 | St. Louis |
| 4,930,583 A | | 6/1990 | Fushiya et al. |
| 4,941,231 A | | 7/1990 | Jarosak |

(Continued)

FOREIGN PATENT DOCUMENTS

DE        35 16099 A1    11/1986

(Continued)

*Primary Examiner*—Scott A. Smith
(74) *Attorney, Agent, or Firm*—Michael P. Leary; Charles E. Yocum; Adan Ayala

(57) ABSTRACT

An electrically powered tool having a dust collection unit powered by a motor, which unit can be releasably fitted to the tool includes a plug arrangement and a cooperating socket arrangement, one of which is formed on the tool and the other of which is formed on the unit. A first mechanical fixing arrangement is provided comprising a first projection and a first cooperating recess, one of which is formed on the tool and the other of which is formed on the unit. A second mechanical fixing arrangement is provided and comprises a manually actuable releasable latch arrangement and a second cooperating recess, one of which is formed on the tool and the other of which is formed on the unit. The first and second mechanical fixing arrangements cooperate to secure the dust collection unit to the tool in such a way that the plug and socket arrangements form an electrical connection.

24 Claims, 4 Drawing Sheets

U.S. PATENT DOCUMENTS

| | | |
|---|---|---|
| 5,090,499 A | 2/1992 | Cuneo |
| 5,099,157 A | 3/1992 | Meyer |
| 5,113,951 A | 5/1992 | Houben et al. |
| 5,120,983 A | 6/1992 | Samann |
| 5,129,467 A | 7/1992 | Watanabe et al. |
| 5,199,174 A | 4/1993 | Wild |
| 5,199,501 A | 4/1993 | Kluber et al. |
| 5,256,906 A | 10/1993 | Tsuge et al. |
| 5,467,835 A | 11/1995 | Obermeier et al. |
| 5,541,457 A | 7/1996 | Morrow |
| 5,662,440 A | 9/1997 | Kikuchi et al. |
| 5,747,973 A | 5/1998 | Robitaille et al. |
| 5,881,823 A | 3/1999 | Kabatnik et al. |
| 5,904,453 A | 5/1999 | Gavia |
| 5,955,791 A | 9/1999 | Irlander |
| 6,060,793 A | 5/2000 | Cousy |
| 6,222,285 B1 | 4/2001 | Haley et al. |
| 6,223,835 B1 | 5/2001 | Habedank et al. |
| 6,296,065 B1 * | 10/2001 | Carrier ............ 173/217 |
| 6,376,942 B1 | 4/2002 | Burger et al. |
| 6,412,572 B1 * | 7/2002 | Habedank et al. ......... 173/217 |
| 6,502,949 B1 * | 1/2003 | Horiyama et al. ......... 362/119 |
| 6,536,536 B1 * | 3/2003 | Gass et al. ............ 173/2 |
| 6,615,930 B1 * | 9/2003 | Bongers-Ambrosius et al. ............ 173/198 |
| 2002/0129949 A1 | 9/2002 | Bongers-Ambrosisus |

FOREIGN PATENT DOCUMENTS

| | | |
|---|---|---|
| EP | 0 434 295 A2 | 12/1990 |
| GB | 1 569 532 | 5/1978 |
| GB | 2 344 648 A | 12/1998 |

\* cited by examiner

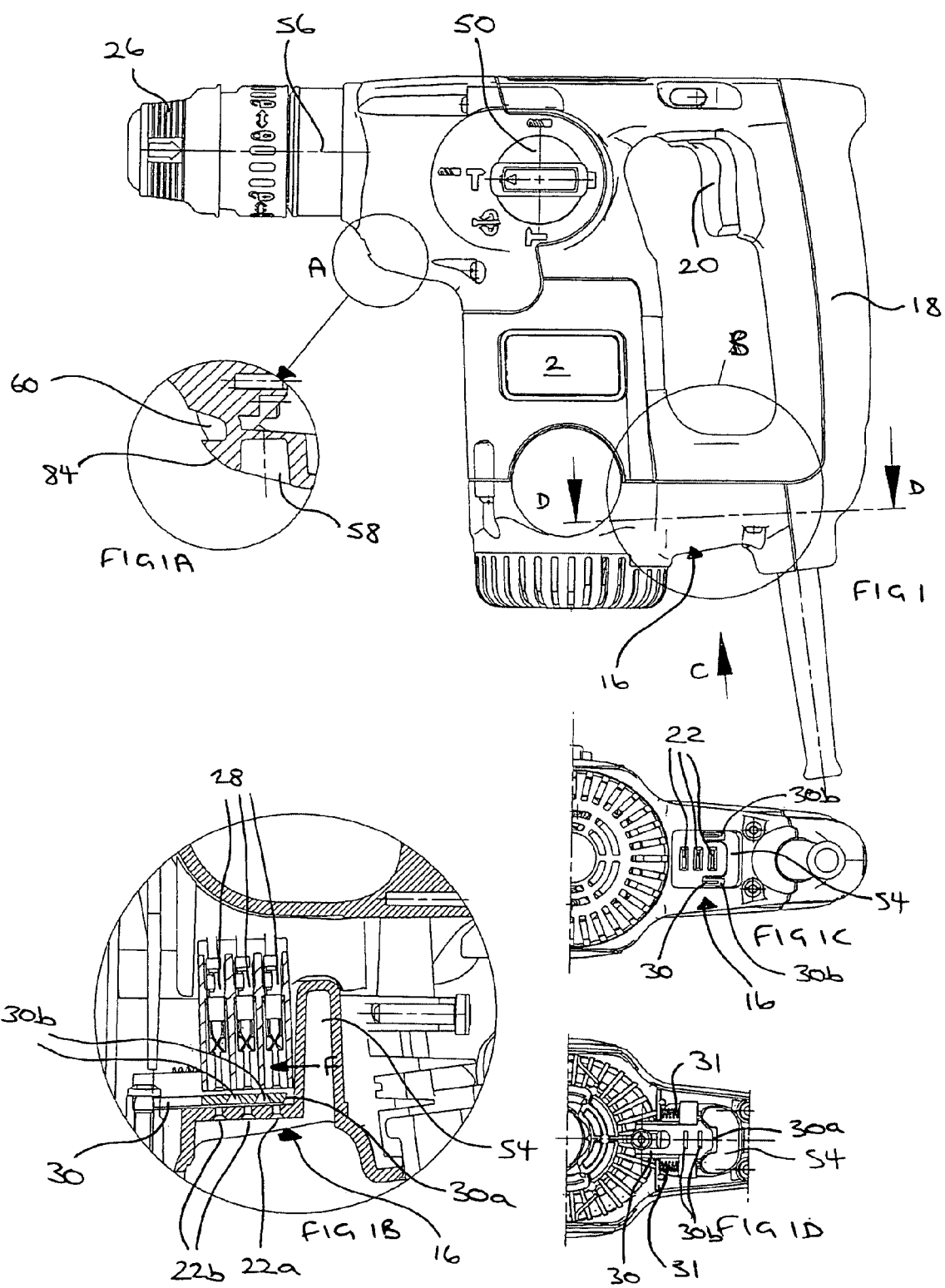

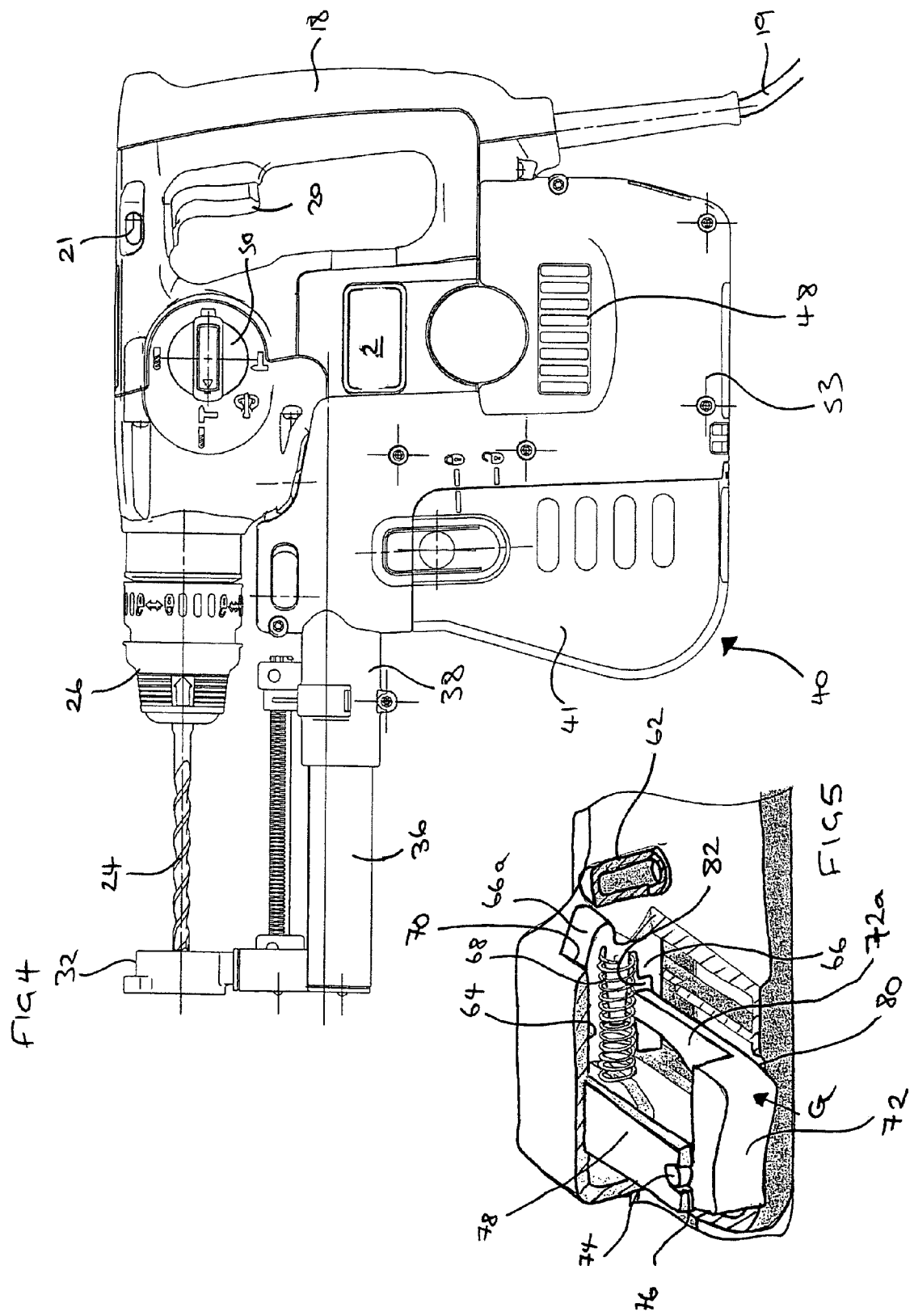

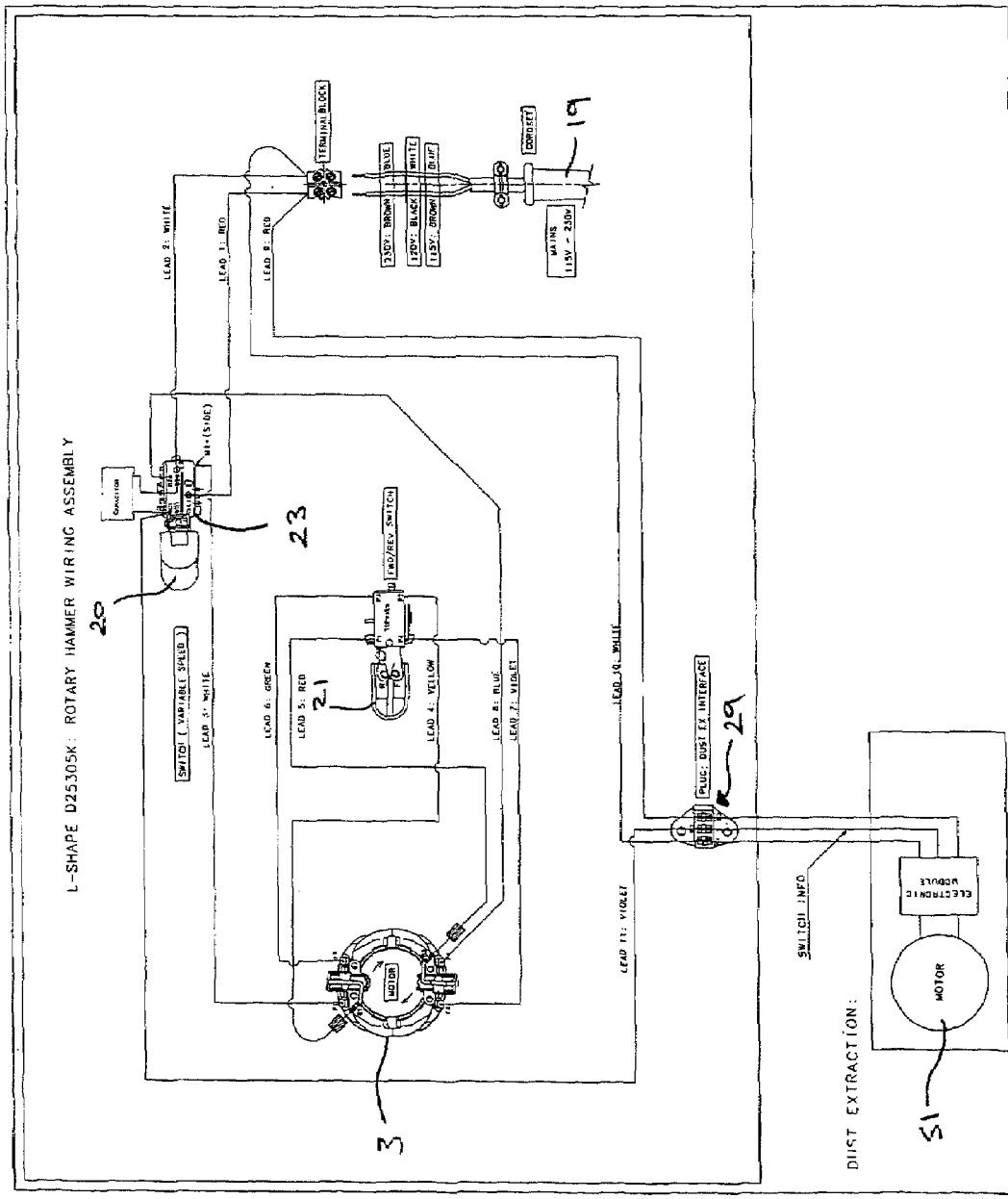

HAND HELD DRILLING AND/OR HAMMERING TOOL WITH DUST COLLECTION UNIT

The present invention relates to a hand held drilling and/or hammering tool with a dust collection unit and to a dust collection unit for such a tool.

BACKGROUND OF THE INVENTION

Hand held drilling and/or hammering tools are know which can be used with a dust collection unit accessory. The collection unit, may be releaseably mechanically mounted on the tool and will generally comprise a shroud for collecting dust from the region of a tool or bit of the tool, a dust collection chamber, a filter and a system for generating an airflow into and through the shroud, the chamber and the filter. Dust and debris generated by the tool or bit of the tool will be entrained in this airflow and so will be pulled into the shroud and into the chamber. As the air passes through the filter, any dust or debris entrained within it will be deposited in the chamber.

The system for generating the airflow will generally include a fan, which fan may be housed in the tool or in the dust collection unit. When the fan is housed in the tool, it is powered by the motor of the tool and it may have the dual function of also generating an airflow which cools components of the tool. An outlet from the dust collection unit will mate with an inlet to the fan of the tool in order to generate the airflow in the dust collection unit. When the fan is housed in the dust collection unit, it is known to power the fan by using the motor of the tool, for example by an end of the tool motor armature shaft engaging a shaft of the fan to rotatingly drive the fan. A problem with these types of dust collection units is that the fan is driven at the speed of rotation of the motor of the tool and so an optimum motor speed for the tool and not for the fan is selected for the speed of rotation of the motor. In addition the speed of rotation of the motor may reduce, for example, when the tool is working hard. Therefore, the speed of the motor is not selected to be the optimum speed for the fan.

A separate motor can be used for powering the fan of the dust collection unit, which motor is mounted within a housing of the dust collection unit. This has the advantage that the characteristics of the motor can be specifically tailored to optimise the airflow through the dust collection unit. However, some means is required for connecting the motor of the dust collection unit to a power supply.

BRIEF SUMMARY OF THE INVENTION

The present invention aims to provide an efficient dust extraction unit which can be easily mounted on a drilling and/or hammering tool.

According to a first aspect of the present invention there is provided an electrically powered hand held drilling and/or hammering tool having a dust collection unit powered by a motor housed in the unit, which unit can be releasably fitted to the tool, comprising:

a plug arrangement and a cooperating socket arrangement, one of which is formed on the tool and the other of which is formed on the unit, for electrically connecting the power supply for the tool to the motor of the unit;

a first mechanical fixing arrangement comprising a first projection and a first cooperating recess, one of which is formed on the tool and the other of which is formed on the unit, located adjacent the respective part of the plug and socket arrangements; and a second mechanical fixing arrangement, located remotely from the first and comprising a manually actuable releasable fixing arrangement, such as a latch arrangement, and a second cooperating recess, one of which is formed on the tool and the other of which is formed on the unit, wherein the first and second mechanical fixing arrangements cooperate to secure the dust collection unit to the tool in such a way that the plug and socket arrangements form an electrical connection.

The present invention provides a dust collection unit having its own motor, which can be tailored to the fan so that an optimum level of airflow is generated so as to optimise the performance of the dust collection unit. In addition it provides a robust and ergonomic fixing arrangement for releasably securing the dust collection unit to the tool, which fixing arrangement facilitates the use of only a single manually operable actuator, for easy fixing and release of the unit with respect to the tool. The fixing arrangement by which the unit is fitted to the tool also ensures automatic electrical connection between the motor of the unit and the power supply to the tool.

For a robust fixing of the unit to the tool, the first recess may be positioned at an oblique angle to, and preferably substantially perpendicular, to the second recess. Similarly, the releasable fixing arrangement may comprises a latching peg which extends at an oblique angle to, and preferably substantially perpendicular, to the first projection.

The plug arrangement may comprises a plurality of electrical connection pins and so as to help prevent damage to the pins, the first projection may be positioned adjacent to the plug arrangement so as to extend alongside the pins. To this end, the plug arrangement and the first projection may be located adjacent each other on one of the tool or the dust collection unit. So as to be able to cooperate with their corresponding components, the socket arrangement and the first recess may be located adjacent each other on the other of the tool or the dust collection unit. In a particular embodiment according to the present invention, the plug arrangement may be located on the dust collection unit and the socket arrangement may be located on the tool.

Where the socket arrangement is adjacent to the first recess on one of the tool or the unit and the plug arrangement is adjacent to the first projection on the other of the tool or unit and the socket arrangement may additionally comprises a socket cover, for covering an entrance to the socket arrangement when the unit is not fitted to the tool, which socket cover is engageable by the first projection to open the entrance when the unit is fitted to the tool. In this way the socket arrangement is protected by the cover from the ingress of dust when the unit is not fitted to it, and is opened for connection to the plug arrangement during fitment to the tool. The socket cover may by slideable and an arm of the socket cover which extends into the first recess may be engaged by the first projection so as to slide the cover with respect to the entrance to open the entrance when the projection passes into the first recess.

The dust collection unit may include a fan powered by the motor of the unit so as to generate a dust collecting airflow. In this case, the dust collection unit may comprise a shroud for collecting dust from the region of a tool or bit of the tool, which shroud communicates with a filter housing, incorporating a filter, such that an airflow generated by the fan passes into the shroud, into the filter housing and then into the fan.

The tool and unit according to the present invention may additionally include a guide projection and a corresponding guide bore, one of which is formed on the tool and the other of which is formed on the unit, located adjacent the respective part of the second mechanical fixing arrangement. This helps to secure the second mechanical fixing arrangement and to provide a robust mechanical connection between the tool and the unit. Again, the guide projection and guide bore preferably extend at an oblique angle, and preferably perpendicularly, to a latching peg of the releasable fixing arrangement.

According to a second aspect of the present invention there is provided a dust collection unit powered by a motor housed in the unit, which unit is suitable for fitting to an electrically powered hand held drilling and/or hammering tool, comprising:

one of a plug arrangement or a cooperating socket arrangement, the other of which is formed on such a tool, for electrically connecting a power supply for such a tool to the motor of the unit;

a first mechanical fixing arrangement comprising one of a first projection or a first cooperating recess, the other of which is formed on such a tool, which first mechanical fixing arrangement is located adjacent the one of the plug and socket arrangement on the unit; and a second mechanical fixing arrangement, located remotely from the first and comprising one of a manually actuable releasable fixing arrangement, such as a latch arrangement or a second cooperating recess, the other of which is formed on such a tool, wherein the first mechanical fixing arrangement cooperates and the second mechanical fixing arrangement cooperates with respective cooperating arrangements on such a tool to secure the dust collection unit to such a tool in such a way that the plug or socket arrangement on the unit forms an electrical connection to such a tool.

The unit according to the second aspect of the present invention has the same advantages and preferred features as described above in relation to the first aspect of the present invention.

BRIEF DESCRIPTION OF THE DRAWINGS

One form of drilling and/or hammering tool incorporating dust collection unit in accordance with the present invention will now be described by way of example with reference to the accompanying drawings in which:

FIG. 1 shows a perspective view of a rotary hammer to which a dust collection unit can be fitted in accordance with the present invention;

FIG. 1A shows an enlarged longitudinal cross-sectional view of region A of FIG. 1;

FIG. 1B shows an enlarged longitudinal cross-sectional view of region B of FIG. 1;

FIG. 1C shows an enlarged underneath view of region B of FIG. 1 from the direction of arrow C;

FIG. 1D shows a cross-sectional view along line D—D of FIG. 1;

FIG. 2 shows a longitudinal cross-section of a dust collection unit for attachment to the rotary hammer of FIG. 1, in accordance with the present invention;

FIG. 4 shows a side view of the rotary hammer of FIG. 1 with the dust collection accessory of FIG. 2 fitted to it;

FIG. 5 shows a partial longitudinal cross-section of region H of the dust collection unit of FIG. 2; and FIG. 6 shows a circuit diagram of the wiring between the electricity supply to the hammer of FIG. 1 and the motor of the dust extraction unit of FIG. 2.

DETAILED DESCRIPTION OF THE INVENTION

Figure 3:
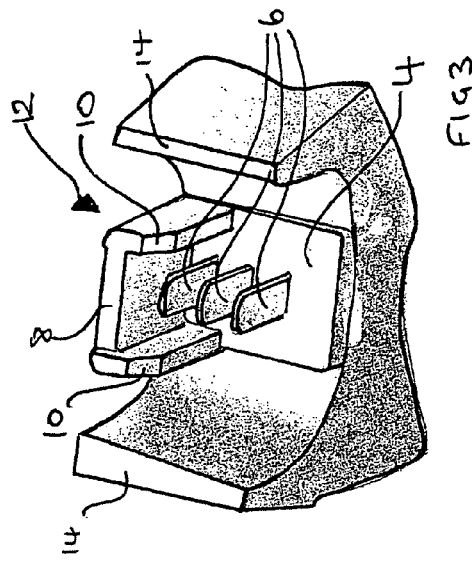
FIG. 3 shows a perspective view of the upper portion of region E of FIG. 2 from the direction of arrow G.
Figure 8:
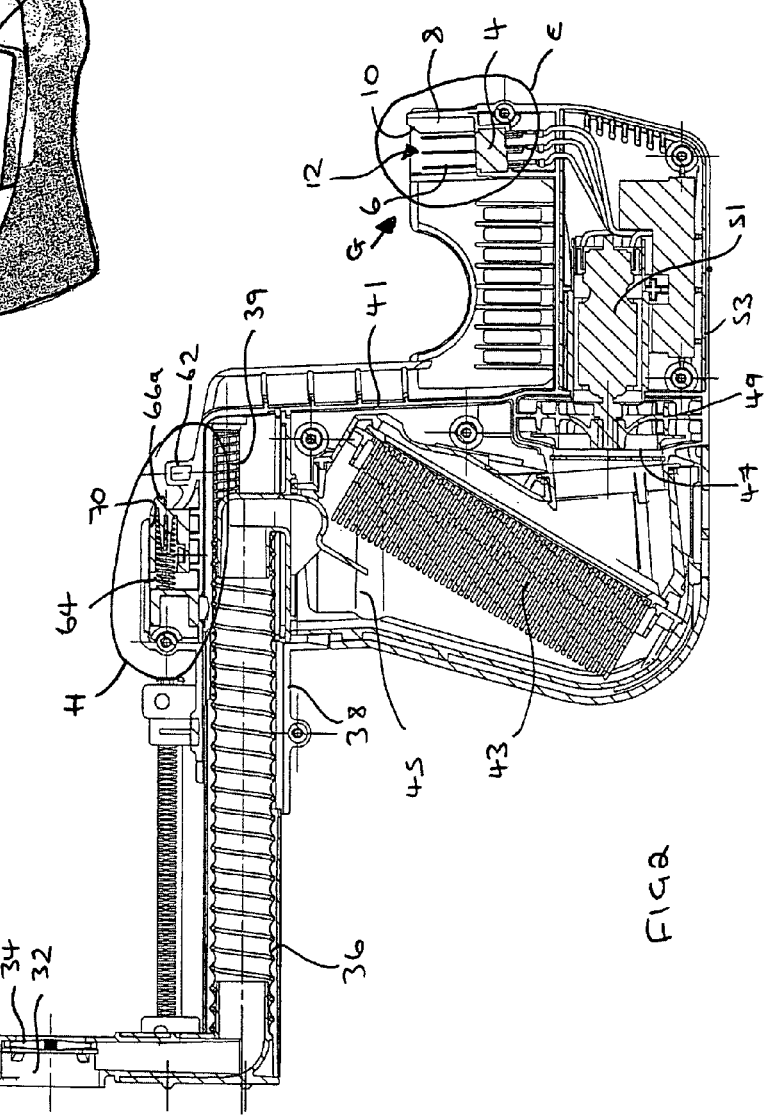

The hand held rotary hammer shown in FIGS. 1 and 4 has a housing comprising a motor housing portion (2) within which an electric motor (3) of the hammer is housed. A tool holder (26) is located at the forward end of a spindle of the hammer. A tool or bit (24) can be non-rotatably and releasably fitted within the tool holder so as to allow limited reciprocation of the tool or bit with respect to the tool holder. The hammer has a rear handle (18) in which an on/off trigger (20) is located for actuating a switch (23) for actuating power supply to the motor. The motor (3) of the hammer selectively drives a spindle drive mechanism for rotatingly driving the spindle of the hammer, thereby rotatingly driving the tool holder (26) and a tool or bit (24) mounted therein, as is well known in the art. Also, the motor of the hammer selectively drives an air cushion hammering mechanism for repeatedly impacting the tool or bit (24), as is well known in the art. A mode change arrangement, actuated by a mode change knob (50), is provided for enabling the selective engagement of rotary drive to the spindle and/or selective actuation of the air cushion hammering mechanism so that the hammer can be operated in a drilling only mode, a hammering only mode and/or a combination rotary hammering mode, as is well known in the art. The rotary hammer is powered by a mains or generator supply of electricity, via a cable (19).

FIGS. 2 and 4 show a dust collection unit (40) for the hammer. The dust collection unit comprises a dust collection shroud (32) which, when the unit (40) is mounted on the hammer (as shown in FIG. 4), surrounds the forward end of a tool or bit (24) mounted in the tool holder (26) of the hammer. The shroud (32) forms a chamber around the forward end of the tool or bit (24), the rearward wall of which is formed by a flexible brush (34) which fits around the tool or bit (24). The shroud (32) is mounted on a support arm (36) which is telescopically mounted within a receiving portion (38) of a main housing of the dust collection unit (40). The support arm (36) can be pushed into the receiving portion (38) against a biasing force from a spring arrangement (39) contained in the receiving portion (38). A channel extends along the support arm (36) with a first end of the channel communicating with the chamber of the shroud (32) and the second end of the channel communicating with an entrance (45) to a filter chamber (41) of the unit (40).

A filter arrangement, for example a filter (43) is housed within the filter chamber. The filter chamber has an inlet (45) which communicates with the channel in the support arm (36) and an outlet (47) which communicates with an inlet to a fan (49). The fan has an outlet (48). The fan is powered by a motor (51) housed in the rearward housing portion (53) of the dust collection unit (40).

When the dust collection unit of FIG. 2 is mounted on the rotary hammer of FIG. 1, as described below the resulting configuration is shown in FIG. 4. The forward end of the tool or bit (24) is pressed against the surface to be worked and the shroud (32) is positioned so that a forward rim of the shroud is pressed against the surface to be worked. Then when the motor (3) of the hammer is actuated, by depressing the trigger (20) of the hammer, the motor of the hammer is actuated and drilling and/or hammering commences, depending on the mode of operation of the hammer selected by the mode change knob (50). The depression of the trigger (20) also actuates the motor (51) of the dust extraction unit (40) fitted to the hammer, as described below.

The fan (49) generates an airflow which is pulled into the shroud (32), for example via one or more recesses in the forward face of a rim of the shroud (32), and from the shroud through the channel in the support arm (36) and into the inlet (45) to the filter housing (41). The dust generated by the working of the tool or bit is entrained in this airflow and thus transported into the filter housing. The dust is captured in the filter housing by the filter (43) and the air passes through the filter and into the inlet (47) of the fan (49). The air passes through the fan and is discharged out of the outlet (48) of the fan. As the tool or bit (24) moves into the surface being worked, the support arm (36) retracts against the biasing force of the spring arrangement (39)and maintains the forwardmost rim of the shroud against the surface being worked. When the trigger (20) of the hammer is released, the power to the hammer motor (3) and the fan motor (51) is disconnected.

When the dust collection unit (40) is fitted to the hammer, an electrical connection (29) (See FIG. 6) is formed between the motor (51) of the dust collection unit and the electricity supply to the hammer via a three pinned plug element (12), shown in detail in FIG. 3. The plug element (12) comprises a base (4) which is mounted in a recess at the rearward end of the dust collection unit's rearward housing portion (53). Three metal pins (6) extend through the base (4). At its rearward end, rearwardly of the base (4) and the pins the rearward housing portion (53) is formed with an upwardly extending projection (8), The projection (8) extends beyond the upper ends of the pins (6) in a direction substantially parallel to the longitudinal axes of the pins. The projection (8) has a substantially U-shaped cross-section in a plane perpendicular to the axes of the pins (6) and at its end remote from the base (4) the forward facing ends (10) of the projection are chamfered. Laterally of the pins (6) the rearward housing portion is formed with a pair of upwardly extending projections (14). The facing inner surfaces of the projections (14) are curved to match the curved surface of the edges of the underside of a portion (B) of the hammer housing, to which the plug element (12) can be fitted. The projection (8) and pair of projections (14) cooperate to provide some protection against damage to the pins (6).

The region (B) of the hammer, which connects the lower end of the rear handle (18) with the motor housing (2) is formed on its underside with a socket arrangement (16). The socket arrangement is shown in longitudinal cross-section in FIG. 1B and an underneath view of the socket arrangement is shown from the direction of the arrow (C) in FIG. 1C.

The socket arrangement (18) is formed with three sockets (28) for receiving the three pins (6) of the plug arrangement (12) in order to make the electrical connection (29) between the motor (51) of the dust collection unit (40) and the electrical power supply to the hammer, as shown in FIG. 6. The entrance to each socket is formed by a slot (22) in the hammer housing.

When the hammer is operated without the dust extraction unit fitted to it the socket (28) must be covered to prevent the ingress of dust. To achieve this a socket cover (30) is slideably mounted within the hammer housing to selectively cover the socket, as shown in FIGS. 1B, 1C and 1D. The socket cover is biased by a spring arrangement (31) into the position shown in FIGS. 1B to 1D in which the cover (30) covers the entrance slots (22) to the sockets (28). The socket cover (30) can be moved in the direction of the arrow (F) in FIG. 1B against the biasing force of the spring arrangement so as to move the rearward end (30a) of the socket cover to the left of rearward most slot (22a) and to align the slots (30b) in the socket cover (30) with the remaining slots (22b) of the socket arrangement and thus open the entrances to the sockets (28). To the rear of the slots (22) the hammer housing is formed with a recess (54) for receiving the projection (8) of the plug arrangement (12) of the dust collection unit (40). Accordingly the recess (54) has a U-shaped cross-section in a plane parallel to the longitudinal fore-aft axis (56) of the hammer, as can be seen in FIG. 1C and 1D. The socket cover is formed with a pair of arms (30b) which extend rearwardly, one to either side of a main central portion of the socket cover. When the socket cover (30) is in the position shown in FIGS. 1B and 1C, the arms (30b) extend out of a pair of corresponding holes in the hammer housing, so that they extend into the opposite ends of the U-shaped recess (54), as shown in FIG. 1C.

The region (A) of the housing of the hammer is formed with a downwardly facing positioning bore (58) and a forwardly facing recess (60), as shown in FIG. 1A. The region (H) of the housing of the dust collection unit (40) shown in FIG. 2, and in more detail in FIG. 5, is formed with a corresponding cylindrical upwardly extending positioning projection (62) for cooperating with the positioning bore (58) in the region (A) of the hammer housing. The region (H) of the dust collection unit (40) is also provided with a latch arrangement, shown in FIG. 5, for releasably engaging with the recess (60) in the region (A) of the hammer housing.

The region (H) of the dust collection unit (40) is formed with a chamber (64) within which is slideably located a latch peg (66) which is biased by a spring (68) so that a projecting end (66a) of the ledge extends out of a hole (70) at the rearward end of the chamber (64). The projecting end (66a) of the latch peg is engageable with the recess (60) in the region (A) of the hammer housing. The latch peg (66) and receiving recess (60) extend in a direction substantially perpendicular to the longitudinal axis (56) of the hammer. An actuator (72) is pivotally mounted in the chamber (64) via a pair of pivot pins (74) (only the upper one of which is shown in FIG. 5) within a pair of recesses (76) formed in a pair of guide rails (78) (only the upper one of which is shown in FIG. 5). The guide rails (78) are formed in the chamber (64) with one located above the actuator (72) and one located below the actuator. The pivoting actuator (72) is L-shaped and the pivot pins (74) are formed towards an end of one of the arms, which arm forms a button which extends outside of the chamber (64) though a hole (80). The other of the arms is formed as a finger (72a) which is engageable with a recess (82) formed in a facing side of the latch peg (66). Thus, when the button formed by the actuator (72) is pressed by a user of the dust collection unit (40), in a direction indicated by the arrow (G), the actuator pivots into the chamber (64) about the pivot pins (74) and the finger (72a) of the actuator moves rearwardly, thereby pulling the latch peg (66) rearwardly against the biasing force of the spring (68) due to the engagement of the finger (72a) in the recess (82) of the latch peg.

With the dust collection unit (40) detached from the hammer, the socket cover (30) is biased into a position in which it covers the entrance slots (22) to the socket arrangements (28). To connect the dust collection unit to the hammer, the projection (8) of the plug arrangement (12) of the dust collection unit is inserted into the corresponding recess (54) formed in the region (B) of the hammer housing rearward of the socket arrangements (28). The chamfered ends (10) of the projection (8) engage the arms (30b) of the socket cover (30), to slide the socket cover forwardly against the biasing force of the spring arrangement so as to open the entrances to the socket arrangements (28). Thus, the pins (6) of the plug arrangement (12) of the dust collection unit can move into the socket arrangements (28) in the region (B) of the hammer housing. The pins (6) are correctly aligned with the entrance slots (22) to the socket arrangements by the engagement of the projection (8) of the plug arrangement within the recess (54) of the socket arrangement. The pins (6) move into the socket arrangements and thereby form the electrical connection (29) between the motor (51) of the dust collection unit (40) with the electrical supply to the hammer, as shown in FIG. 6. As the plug arrangement (12) is moved into the socket arrangements (28) and recess (54) the projections (14) to either side of the pins (6) of the plug arrangement move into engagement around the sides of the region (B) of the hammer housing so as to provide some lateral guidance of the dust collection unit (40) on the hammer housing.

With the plug arrangement (12) inserted in the socket arrangements (28), the forward end of the dust collection unit (40) can be moved upwardly towards engagement with the hammer housing until the positioning projection (62) on region (H) of the dust collection unit engages in the corresponding positioning recess (58) in region (A) of the hammer housing. In this movement the rearward end (66a) of the latching peg is pushed into the chamber (64) in the region (H) of the dust collection unit, against the biasing force of the spring (68) by the portion (84) of the hammer housing between the bore (58) and recess (60). Then as soon as the rearward end (66a) of the latch peg comes into alignment with the recess (60) in region (A) of the hammer housing the spring (68) biases the rearward end (66a) of the latch peg (66) into engagement with the recess (60), to thereby secure the dust collection unit to the hammer.

Accordingly, there are two mechanical fixing points between the hammer and the dust collection unit, the first is in region (B, E) of the hammer and unit and comprises the engagement of the projection (8) in the recess (54) and the second is in region (A, H) of the hammer and unit and comprises the releasable latch (66) and recess (60). This mechanical engagement ensures the automatic electrical connection between the dust collection unit and the hammer.

The dust collection unit is released from the hammer housing by a user depressing the button formed by the actuator (72) of the latch arrangement. This causes the rearward end (66a) of the latch peg to retract from the recess (60) in the hammer housing. Then the dust collection unit can be moved downwardly to disengage the positioning projection (62) from the position bore (58) and the pins (6) and projection (8) of the plug arrangement (12) from the recess (54) and socket arrangements (28). As the plug arrangement (12) is withdrawn from the socket arrangements (28) and recess (54), the projection (8) ceases to engage the arms (30b) of the socket cover and the socket cover (30) is moved under the biasing force of the spring arrangement in the direction opposite to the arrow (F) into the position shown in FIGS. 1B and 1C and so once more covers the entrance slots (22) to the socket arrangements (28).

What is claimed is:

1. An electrically powered hand held drilling and/or hammering tool having a dust collection unit powered by a motor (51) housed in the dust collection unit, which dust collection unit can be releasably fitted to the tool, comprising:
    a power supply circuit located in the tool;
    a plug arrangement (12) and a cooperating socket arrangement (28), one of which is formed on the tool and the other of which is formed on the dust collection unit, for electrically connecting the power supply circuit in the tool to the motor (51) of the dust collection unit;
    a first mechanical fixing arrangement comprising a first projection (8) and a first cooperating recess (54), one of which is formed on the tool and the other of which is formed on the dust collection unit, and
    a second mechanical fixing arrangement, located remotely from the first mechanical fixing arrangement and comprising a manually actuable releasable fixing arrangement (72,66) and a second cooperating recess (60), one of which is formed on the tool and the other of which is formed on the dust collection unit,
    wherein the first and second mechanical fixing arrangements cooperate to secure the dust collection unit to the tool in such a way that the plug and socket arrangements form an electrical connection.

2. A tool according to claim 1 wherein, the first recess (54) extends at an oblique angle to the second recess (60).

3. A tool according to claim 1 wherein the releasable fixing arrangement comprises a latching peg (66) which extends at an oblique angle to the first projection (8).

4. A tool according to claim 1 wherein the plug arrangement (12) comprises a plurality of electrical connection pins (6) and the first projection (8) is adjacent to the plug arrangement (12) and extends alongside the pins.

5. A tool according claim 1 wherein the plug arrangement (12) and the first projection (8) are located adjacent each other on one of the tool and the dust collection unit.

6. A tool according to claim 1 wherein the socket arrangement (28) and the first recess (54) are located adjacent each other on one of the tool and the dust collection unit.

7. A tool according to claim 1 wherein the plug arrangement (12) is located on the dust collection unit and the socket arrangement (28) is located on the tool.

8. A tool according to claim 1 wherein the socket arrangement (28) is adjacent to the first recess (54) on one of the tool and the dust collection unit and the plug arrangement is adjacent to the first projection (8) on the other of the tool and the dust collection unit and the socket arrangement additionally comprises a socket cover (30), for covering an entrance (22) to the sockets arrangement when the unit is not fitted to the tool, which socket cover is engageable by the first projection (8) to open the entrance (22) when the dust collection unit is fitted to the tool.

9. A tool according to claim 8 wherein the socket cover is slideable and an arm (30b) of the socket cover extends into the first recess (54) and is engaged by the projection (8) to open the entrances (22) when the projection (8) passes into the first recess (54).

10. A tool according to claim 1 wherein the dust collection unit (40) includes a fan (49) powered by the motor (51) of the unit so as to generate a dust collecting airflow.

11. A tool according to claim 10 wherein the dust collection unit comprises a shroud (32) for collecting dust from the region of an accessory of the tool, which shroud communicates with a filter housing, incorporating a filter, such that an airflow generated by the fan passes into the shroud, into the filter housing and then into the fan.

12. A tool according to claim 1 additionally including a guide projection (62) and a corresponding guide bore (58), one of which is formed on the tool and the other of which is formed on the dust collection unit.

13. A tool according to claim 12 wherein the guide projection (62) and guide bore (58) extend at an oblique angle to a latching peg of the releasable fixing arrangement (72, 66).

14. A tool according to claim 12 wherein the guide projection and guide bore extend substantially perpendicular to a latching peg of the releasable fixing arrangement.

15. A tool according to claim 1 wherein the releasable fixing arrangement is a releasable latch arrangement (72, 66).

16. A tool according to claim 1 wherein the first recess is substantially perpendicular to the second recess.

17. A tool according to claim 1 wherein the releasable fixing arrangement comprises a latching peg which extends substantially perpendicular to the first projection.

18. A dust collection unit powered by a motor (51) housed in the dust collection unit, which dust collection unit is suitable for fitting to an electrically powered hand held drilling and/or hammering tool having a power supply circuit, the dust collection unit comprising:
one of a plug arrangement (12) and a cooperating socket arrangement (28), for electrically connecting the power supply circuit for the tool to the motor (51) of the unit;
a first mechanical fixing arrangement comprising one of a first projection (8) and a first cooperating recess (54), which first mechanical fixing arrangement is located adjacent the one of the plug arrangement and socket arrangement on the unit; and
a second mechanical fixing arrangement, located remotely from the first mechanical fixing arrangement and comprising one of a manually actuable releasable fixing arrangement (72,66) and a second cooperating recess (60),
wherein the first mechanical fixing arrangement and the second mechanical fixing arrangement are engageable with the tool to secure the dust collection unit to the tool in such a way that the one of the plug arrangement and socket arrangement on the dust collection unit forms an electrical connection to the tool.

19. A dust collection unit according to claim 18 wherein, the first mechanical fixing arrangement extends in a direction at an oblique angle to the direction in which the second mechanical arrangement fixing extends.

20. A dust collection unit according to claim 18 wherein the plug arrangement (12) is located on the dust collection unit and comprises a plurality of electrical connection pins (6) and the first projection (8) is located on the unit adjacent to the plug arrangement (12) and extends alongside the pins.

21. A dust collection unit according to claim 18 wherein the plug arrangement (12) and the first projection (8) are located adjacent each other on the dust collection unit.

22. A dust collection unit according to claim 18 which includes a fan (49) powered by the motor (51) of the dust collection unit so as to generate a dust collecting airflow.

23. A dust collection unit according to claim 22 which includes a shroud (32) for collecting dust from the region of a tool accessory, which shroud communicates with a filter housing, incorporating a filter, such that an airflow generated by the fan passes into the shroud, into the filter housing and then into the fan.

24. A unit according to claim 18 wherein the first mechanical fixing extends in a direction substantially perpendicular to the direction in which the second mechanical fixing extends.

* * * * *